United States Patent [19]
Dils et al.

[11] Patent Number: 5,727,434
[45] Date of Patent: Mar. 17, 1998

[54] CIRCULAR SAW AIR TABLE

[75] Inventors: Jeffrey M. Dils, Piedmont, S.C.; Marc Francis, Glenbrook, Australia

[73] Assignee: Ryobi America Corporation, Anderson, S.C.

[21] Appl. No.: 106,352

[22] Filed: Aug. 13, 1993

[51] Int. Cl.⁶ .............................. B26D 7/01; B25B 11/00
[52] U.S. Cl. ...................... 83/169; 83/451; 83/477.2; 137/625.12; 137/875; 269/20; 269/21; 414/676
[58] Field of Search ........................ 83/451, 477.2, 83/98, 169; 269/21, 295, 20; 414/676; 451/388; 137/625.11, 625.12, 625.15, 875

[56] References Cited

U.S. PATENT DOCUMENTS

| | | |
|---|---|---|
| 2,572,640 | 10/1951 | Lovegrove ............. 137/625.12 X |
| 2,879,875 | 3/1959 | Swackhamer . |
| 3,076,366 | 2/1963 | Granstedt . |
| 3,143,016 | 8/1964 | Obenshain . |
| 3,196,910 | 7/1965 | Hawkins . |
| 3,253,665 | 5/1966 | Schienle . |
| 3,406,938 | 10/1968 | Muir, Jr. ..................... 269/21 X |
| 3,513,934 | 5/1970 | Crowley . |
| 3,592,095 | 7/1971 | Passa et al. ................. 269/21 X |
| 3,765,289 | 10/1973 | Gerber et al. ............... 269/21 X |
| 3,807,035 | 4/1974 | Moorman et al. . |
| 3,835,747 | 9/1974 | Bystron ..................... 83/451 X |
| 3,848,327 | 11/1974 | Gerber et al. ............... 269/21 X |
| 3,964,355 | 6/1976 | Daniels . |
| 3,979,984 | 9/1976 | Daniels . |
| 3,998,116 | 12/1976 | Helm . |
| 4,052,780 | 10/1977 | Daniels . |
| 4,058,885 | 11/1977 | Bergman . |

(List continued on next page.)

FOREIGN PATENT DOCUMENTS

93/022104  11/1993  WIPO ........................ 269/21

OTHER PUBLICATIONS

Advertisement for "Giben America, Inc." (labelled AR-1).
Advertisement for "Holzma=U.S." (labelled AR-2).
Advertisement for "Holzma=U.S." (labelled AS-1).
Advertisement for "Selco, a Biesse Group Co." (labelled AS-2).
Advertisement for "Selco, a Biesse Group Co." (labelled AT-1).
Advertisement for "Schelling America, Inc." (labelled AT-2).
Advertisement for "Hendrick RWH Indus., Inc." (labelled AR-3).
Advertisement for "C.R. Onsrud Inverted Router 'Air Table Combo'", Wood & Wood Prods. (Mar., 1994) (labelled AS-3).

(List continued on next page.)

Primary Examiner—Rinaldi I. Rada
Assistant Examiner—Clark F. Dexter
Attorney, Agent, or Firm—Brooks & Kushman P.C.

[57] ABSTRACT

A table saw is disclosed comprising a main saw unit and an air table attachment. The air table is mounted adjacent a main support surface of the main saw unit, and includes a body portion and a generally planar table top. The body portion has a plurality of subsections formed therein. The table top is substantially coplanar with the main support surface, and is attached to the body portion to cover the subsections so that a plurality of holes through the table top communicate between the subsections and the exterior. A shop vacuum produces either a partial vacuum or a stream of pressurized air, and a manifold attached to the body portion selectively communicates the vacuum or stream of air to one or more of the subsections to respectively produce either a suction force or a supporting air cushion over a variable portion of the table top. Preferably, the air table is movable along the front and rear guide rails in a direction transverse to the direction of rotation of the saw blade. The air table can also be moved from one side of the rotatable blade to the other side to accommodate the workpiece.

10 Claims, 3 Drawing Sheets

U.S. PATENT DOCUMENTS

| | | | |
|---|---|---|---|
| 4,066,249 | 1/1978 | Huber et al. | 269/21 |
| 4,131,267 | 12/1978 | Ono et al. | 269/21 |
| 4,280,782 | 7/1981 | Stumpf | 269/20 X |
| 4,313,478 | 2/1982 | Suzuki | 83/451 X |
| 4,354,796 | 10/1982 | Bergman . | |
| 4,359,218 | 11/1982 | Karis | 271/188 |
| 4,371,309 | 2/1983 | Principe et al. . | |
| 4,392,915 | 7/1983 | Zajac | 269/21 X |
| 4,444,541 | 4/1984 | Bergman . | |
| 4,468,017 | 8/1984 | Pavone | 269/21 |
| 4,485,712 | 12/1984 | Gerber | 83/451 |
| 4,527,346 | 7/1985 | Schwartzott . | |
| 4,576,072 | 3/1986 | Terpstra et al. | 83/100 X |
| 4,644,833 | 2/1987 | Jenkner . | |
| 4,648,779 | 3/1987 | Weitzman | 83/451 X |
| 4,702,664 | 10/1987 | Lukens, Jr. . | |
| 4,721,462 | 1/1988 | Collins, Jr. | 269/21 X |
| 4,759,677 | 7/1988 | Lukens, Jr. . | |
| 4,787,178 | 11/1988 | Morgan et al. . | |
| 5,040,444 | 8/1991 | Shiotani et al. . | |
| 5,116,249 | 5/1992 | Shiotani et al. . | |
| 5,119,704 | 6/1992 | Wolfson | 83/941 X |
| 5,123,317 | 6/1992 | Barnes, Jr. et al. . | |
| 5,211,092 | 5/1993 | Blasi . | |
| 5,222,719 | 6/1993 | Effner | 269/21 |
| 5,246,331 | 9/1993 | Hallahan et al. . | |
| 5,379,815 | 1/1995 | Brazell et al. | 269/21 X |

OTHER PUBLICATIONS

Article, "Air Table Solve Scratch Problems On Tops, Reduce Labor In Handling", by James Powell, Publisher (labelled AT–3—2 pages).

Ryobi Owner's Operating Manual 10 Table Saw/Bt–3000–Jun., 1991.

CIRCULAR SAW AIR TABLE

TECHNICAL FIELD

This invention relates to a circular saw table having a rotatable blade for cutting a workpiece, and more particularly to an improved saw table using pressurized air to elevate or clamp that or another workpiece.

BACKGROUND ART

Generally, a table saw for cutting a workpiece has a circular saw table formed with an elongated generally rectangular opening through which a circular saw blade projects. The workpiece is supported on the saw table and moved in a longitudinal direction over the table during cutting.

Often, the table saw includes front and rear guide rails extending in a direction transverse to the longitudinal cutting direction. These guide rails mount a rip fence for movement in the transverse direction. The rip fence is fixedly positionable to the guide rails to a dimension of the workpiece to be cut.

Workpieces of sufficient size and weight, such as a four feet by eight feet plywood sheet, are difficult to move on the saw table. Moving such large workpieces can cause fatigue to an operator and can also result in inaccuracy in the cutting due to starting and stopping of the workpiece during cutting.

SUMMARY OF THE INVENTION

The present invention is a table saw comprising a main saw unit and an air table attachment. The main saw unit includes a generally planar support surface, a circular saw projecting at least partially through the support surface, and a pair of guide rails extending from the main saw unit in a direction generally transverse to the direction of rotation of the circular saw.

The air table is mounted adjacent the main support surface for supporting a workpiece, and includes a body portion and a generally planar table top. The body portion has a plurality of subsections formed therein. The table top is substantially coplanar with the main support surface, and is attached to the body portion to cover the subsections so that a plurality of holes through the table top communicate between the subsections and the exterior. Vacuum means are provided for producing either a partial vacuum or a stream of pressurized air, and valve means selectively communicate at least a portion of the vacuum or stream of air to one or more of the subsections to respectively produce either a suction force or a supporting air cushion over a variable portion of the table top. Preferably, the air table is movable along the front and rear guide rails in the transverse direction. The air table can also be moved from one side of the rotatable blade to the other side to accommodate the workpiece.

Accordingly, it is an object of the present invention to provide an air table for a table saw of the type described above which alternately produces either suction force or a blowing force over all or part of the surface area of the air table.

Another object of the present invention is to provide an air table of the type described above that is laterally adjustable relative to the saw.

Still another object of the present invention is to provide an improved table saw of the type described above having an air table which alternately produces either a suction force or a blowing force over all or part of the surface area of the air table.

These and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
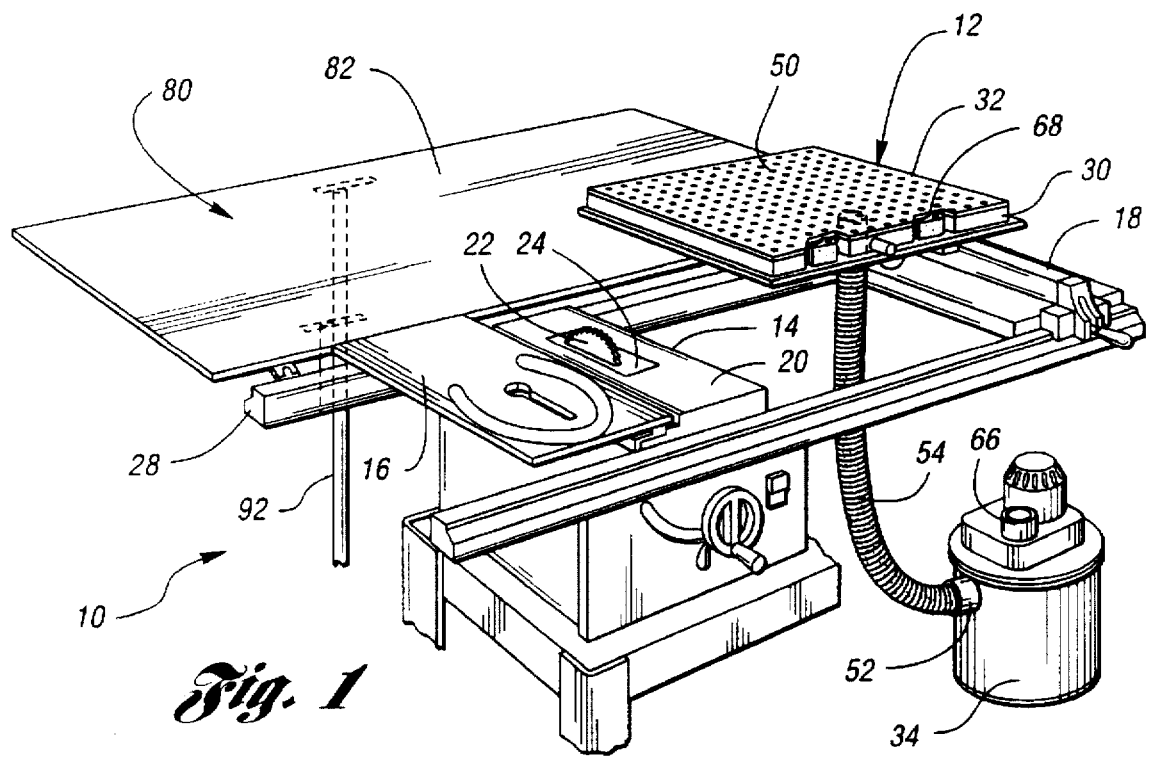
FIG. 1 is a perspective view of a circular saw table having a rotatable blade for cutting a workpiece, front and rear guide rails and a movable rip fence mounted on the rails and illustrating an air table connected to a shop vacuum.

With reference to the drawings, the preferred embodiments of the present invention will be described. FIG. 1 shows an improved table saw 10 according to the present invention including an air table 12 for supporting a workpiece (not shown), either while the workpiece is being cut on the table saw or while another forming operation such as routing is being performed. As described more fully below, the air table 12 alternately utilizes blowing air to slightly elevate the workpiece on a cushion of air, or sucking air to clamp the same or a different workpiece while performing the other forming operations.

The table saw 10 comprises a main saw unit 14, a sliding miter table 16, the air table 12, and a movable rip fence 18 for determining a cutting dimension of the workpiece. The main saw unit 14 includes a generally planar support surface 20, a circular saw 22 projecting at least partially through an elongated generally rectangular opening 24 in the support surface, and a pair of guide rails 26 and 28 extending from the main saw unit in a direction generally transverse to the direction of rotation of the circular saw. Various details of this arrangement are disclosed in U.S. Pat. No. 5,040,444 to Shiotani et al., U.S. Pat. No. 5,116,249 to Shiotani et al., U.S. Pat. No. 5,123,317 to Barnes, Jr. et al., and U.S. Pat. No. 5,201,863 to Peot, all of which are hereby incorporated by reference.

Figure 2:
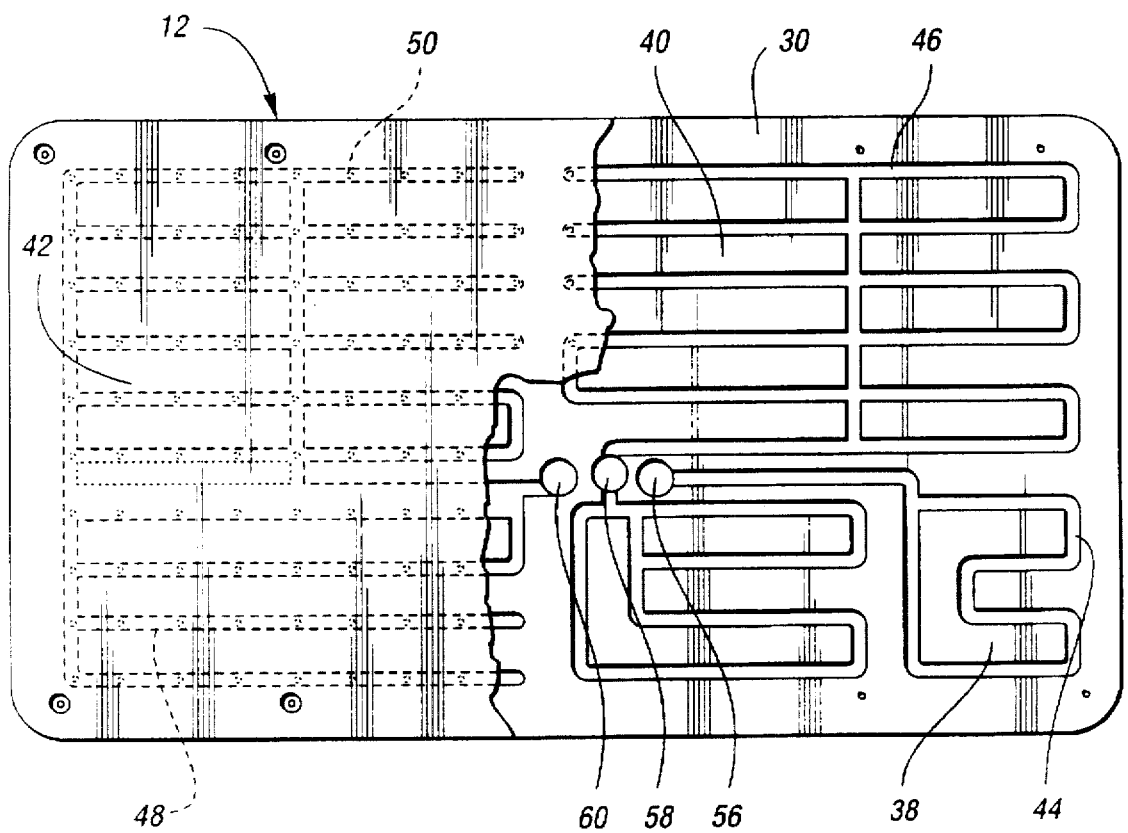
FIG. 2 is a sectional plan view of the air table.

The air table 12 includes a body portion 30, a generally planar table top 32, a shop vacuum 34, and a connector or manifold 36 attached to the underside of the body portion. As best shown in FIG. 2, the body portion 30 has three separate subsections 38, 40 and 42 formed therein. The body portion 30 is preferably conventional particle board, and the subsections 38, 40 and 42 are each formed with a plurality of interconnected passageways respectively 44, 46 and 48 routed out of the particle board. The table top 32 is laminated or otherwise attached to the body portion 30 to cover the subsections, and has a plurality of holes 50 therethrough aligned generally over the passageways 44, 46 and 48.

Figure 3:
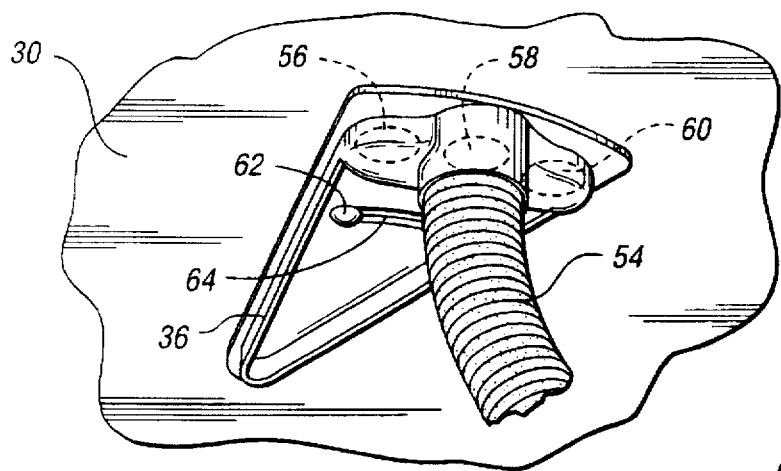
FIG. 3 is a bottom perspective view of the underside of the air table showing a valving system for controlling air flow to or from subsections of the air table.

An inlet port 52 of the shop vacuum 34 is connected through a hose 54 to the manifold 36 so that the shop vacuum functions to produce at least a partial vacuum at the manifold. As shown in FIG. 3, the manifold 36 is pivotable to uncover one or more of three ports 56, 58 and 60 formed in the bottom of the body portion 30. Means such as a screw 62 which rides in a slot 64 in the manifold are also provided to retain the manifold in the desired position. The ports 56, 58 and 60 are respectively in communication with the passageways 44, 46 and 48 of the subsections 38, 40 and 42 such that the manifold 36 functions as a valve means for selectively communicating at least a portion of the vacuum produced by the vacuum means to one or more of the subsections.

For example, when only port 56 is covered by the manifold 36, a suction force is produced in the subsection 38 in the lower righthand corner of the table top 32. When ports 56 and 58 are covered, a suction force is produced in the subsections 38 and 40 encompassing the entire righthand half of the table top 32. If the manifold 36 is positioned to cover all the ports 56, 58 and 60, a suction force is generated in all of the subsections 38, 40 and 42 and thus over all of the table top 32. A suction force for inhibiting movement of the workpiece over the table top 32 can thereby be produced over a variable portion of the table top which diminishes or obviates the need for mechanical clamps. Of course, it should be appreciated that the hose 54 can alternately be connected to an outlet port 66 of the shop vacuum 34 to communicate pressurized air to the manifold 36 and therefore, depending on the orientation of the manifold, to one or more of the subsections. Thus the air blowing through the holes 50 in the table top 32 will generate a cushion of air to slightly elevate the workpiece, which may be advantageous for example while cutting a large workpiece.

Figure 4:
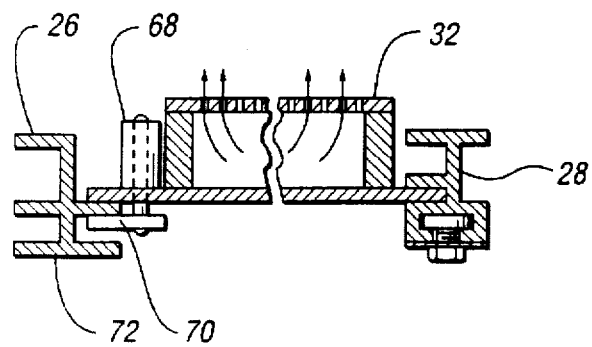
FIG. 4 is a sectional elevational view of the air table illustrating its mounting on the front and rear guide rails.

The air table 12 is mounted on the front and rear guide rails 26 and 28 adjacent the main saw unit 14 in like fashion to the miter table 16 and the rip fence 18. As shown in FIG. 4, a pair of locking levers 68 are provided to draw corresponding locking cams 70 up against a flange 72 of the front rail 26, preferably to position the perforated table top 32 substantially coplanar with the main support surface 20. Because the locking levers 68 are easily loosened, the air table 12 is movable along the guide rails 26 and 28 in the direction transverse to the rotation of the saw blade 22, for instance to adjust the position of the air table generally beneath the center of gravity of the workpiece. Additionally, the air table 12 is easily positionable on the guide rails on either side of the main saw unit 14.

Figure 5:
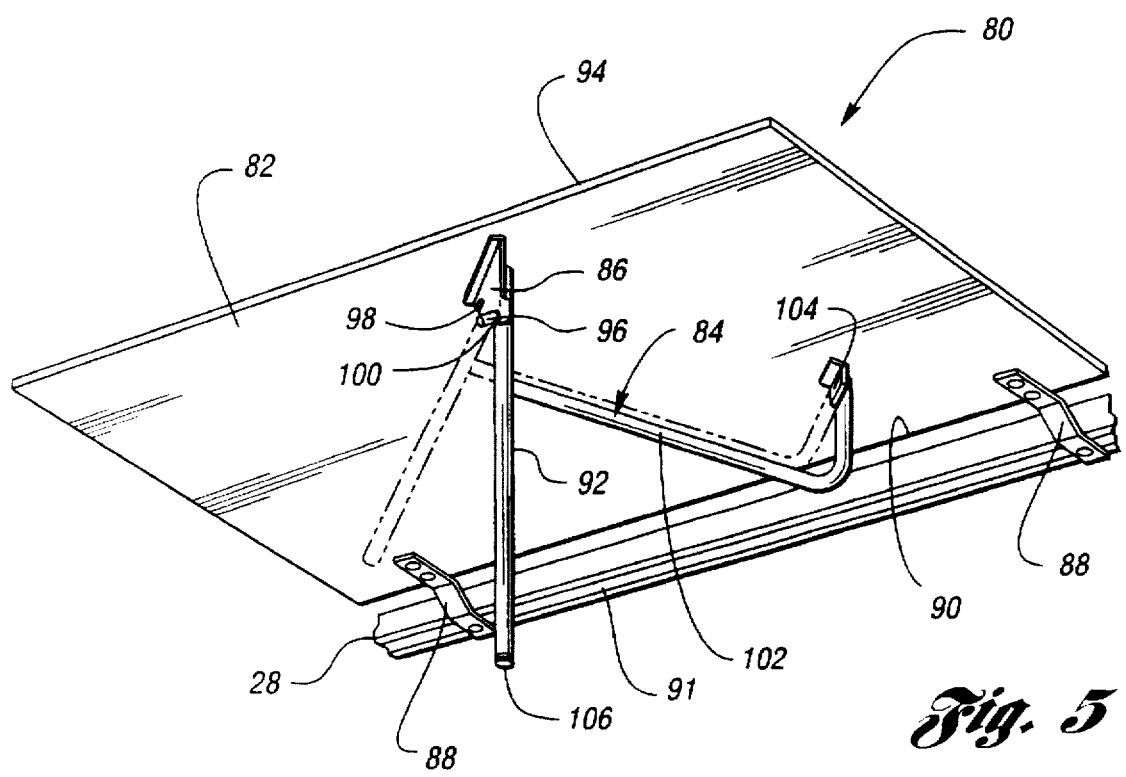
FIG. 5 is a perspective view of the circular saw table including a quick fold table extension assembly.
Figure 6:
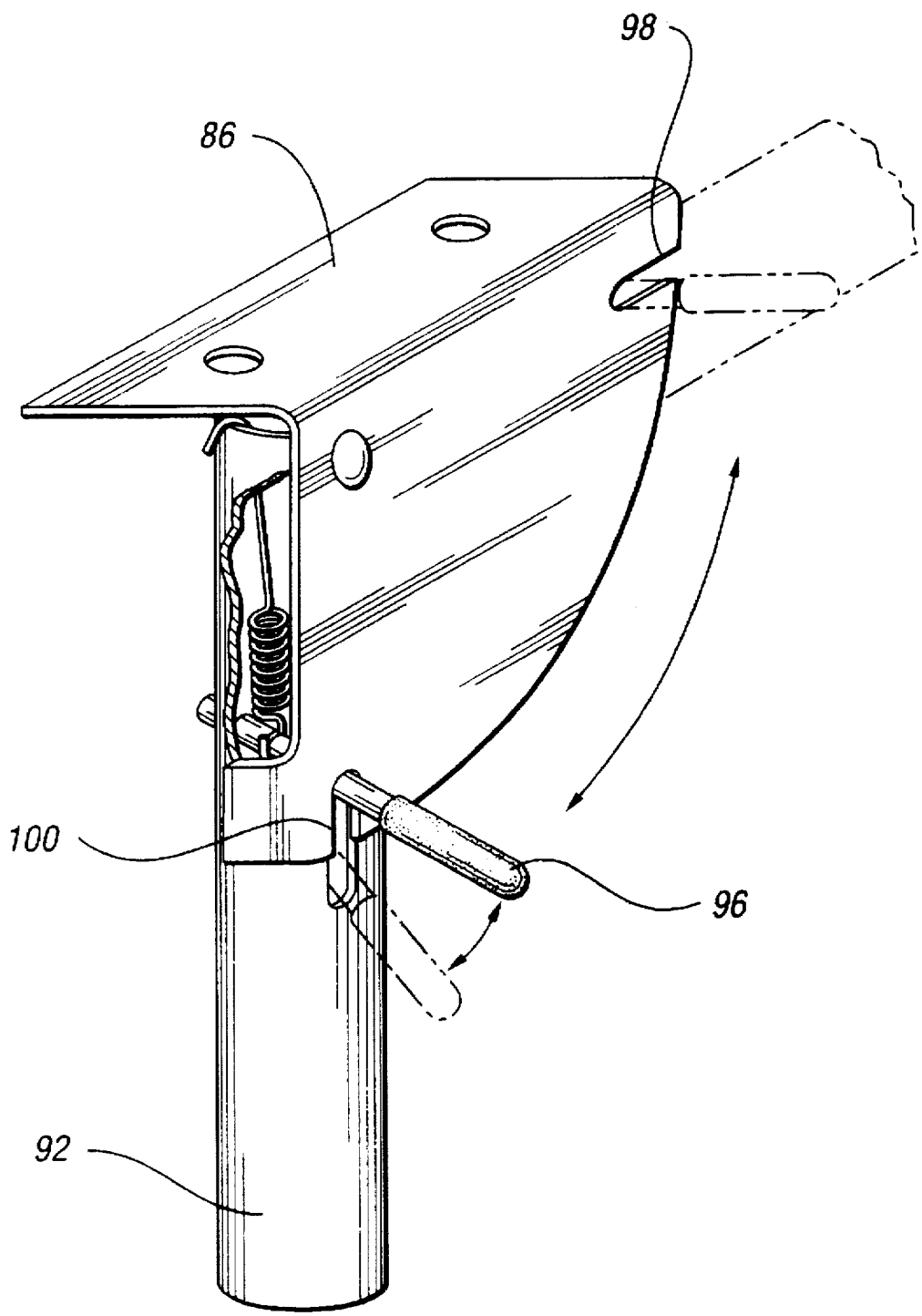
FIG. 6 is a perspective view of a mounting bracket for the table extension assembly.

FIGS. 5 and 6 show a quick fold table extension assembly 80 which provides a portable, self-supporting work surface for accomodating large workpieces exiting from the discharge end of the table saw 10. The foldable extension table assembly 80 comprises a generally planar, rectangular extension table 82, a rectractable or foldable leg 84 and a mounting bracket 86. Means such as hinges 88 are provided for pivotably attaching one end 90 of the extension table to a bottom slot 91 of the rear guide rail 28 proximate the discharge end of the table saw.

The mounting bracket 86 is fastened to the underside of the extension table 82, and pivotably mounts a main fork 92 of the leg 84 proximate the middle of a distal end 94 of the extension table to allow the leg to move between a folded position shown in phantom and an extended use position. A spring loaded lever 96 which extends through the main fork 92 is adapted to selectively engage notches 98 and 100 in the bracket 86 to provide a means of locking the leg 84 in the folded or extended position, respectively. To accomodate this pivotal movement, a branch portion 102 of the leg is provided with a conventional pin-type hinge 104.

In the folded position, the leg 84 lies diagonally across and substantially flush with the bottom of the extension table 82. With the leg in the folded position, the extension table is allowed to lie substantially flush with the rear side of the table saw without interfering with any dust collection hose and/or dust collection bag frequently mounted to the back of the unit. When the extension table 82 is so folded for storage or during non-use, the extension table is easily moved with the table saw.

In the extended position, the leg 84 extends from the extension table 82 at an angle of about 90 degrees to support the extension table off the floor or ground. The leg 84 may be longer than either the height or width of the extension table, and its precise length is intended to ensure that the extension table 82 lies generally coplanar with the work surface 20 of the table saw when the leg is in the extended position. A foot 106 which is variably extensible by about one inch is preferably provided on the bottom of the main fork 92 of the leg 84 to allow minor leveling adjustments to be made. Finally, the hinges 88 of the extension table assembly 80 are movable in the slot 91 of the guide rail 28 to adjust the relative lateral position of the extension table 82 with respect to the table saw.

While the best mode for carrying out the invention has been described in detail, those familiar with the art to which this invention relates will recognize various alternative designs and embodiments for practicing the invention as defined by the following claims.

What is claimed is:

1. A table saw comprising:
   a main support surface;
   a rotatable circular saw cutting blade projecting at least partially through the main support surface and positionable in a first plane substantially perpendicular to the main support surface;
   an air table oriented adjacent the main support surface for supporting a workpiece, the air table including:
      a body portion having a plurality of subsections and a plurality of ports formed therein, each port being in communication with a respective one of the subsections, and
      a generally planar table top having a plurality of holes therethrough and being attached to the body portion to cover the subsections;
   mounting means for mounting the air table such that the generally planar table top thereof is substantially coplanar with the main support surface, the mounting means including a pair of spaced apart guide rails affixed to the main support surface on opposite sides of the circular saw cutting blade and extending from the main support surface in a direction generally transverse to the first plane of the circular saw cutting blade such that the air table is movable along the guide rails in the transverse direction;
   vacuum means for producing a vacuum; and
   valve means for selectively communicating at least a portion of the vacuum produced by the vacuum means to at least one of the ports of the body portion to produce a suction force over a selected portion of the table top for inhibiting movement of the workpiece over the table top.

2. The table saw of claim 1 wherein the valve means comprises a manifold mounted over the plurality of ports in the body portion, the manifold being movable to selectively cover at least one of the ports.

3. The table saw of claim 2 wherein the ports are formed in an underside of the body portion.

4. The table saw of claim 2 wherein the manifold is pivotably attached to the underside of the body portion.

5. A table saw comprising:
- a main saw unit including a generally planar support surface and a circular saw blade projecting at least partially through the support surface, the circular saw blade being positionable in a first plane substantially perpendicular to the planar support surface;
- a pair of parallel spaced apart guide rails extending from the main saw unit in a direction generally transverse to the first plane of the saw blade;
- an air table mounted on and extending between the pair of guide rails and movable in the generally transverse direction relative to the first plane of the circular saw blade, the air table including:
  - a body portion having a plurality of subsections and a plurality of ports formed therein, each port being in communication with a respective one of the subsections, and
  - a generally planar table top substantially coplanar with the main support surface, the table top having a plurality of holes therethrough and being attached to the body portion to cover the subsections;
- vacuum means for producing a vacuum, and
- valve means for selectively communicating at least a portion of the vacuum produced by the vacuum means to at least one of the ports of the body portion to produce a suction force over a selected portion of the table top for inhibiting movement of the workpiece over the table top.

6. A table saw comprising:
- a main support surface;
- a rotatable circular saw cutting blade having an axis of rotation, said circular saw cutting blade projecting at least partially through the main support surface and positionable in a first plane substantially perpendicular to the main support surface;
- an air table oriented adjacent the main support surface for supporting a workpiece and at a position substantially in a direction of the blade axis and spaced from the first plane, the air table including:
  - a body portion having a plurality of subsections and a plurality of ports formed therein, each port being in communication with a respective one of the subsections, and
  - a generally planar table top having a plurality of holes therethrough and being attached to the body portion to cover the subsections;
- a mount supporting the air table such that the generally planar table top thereof is substantially coplanar with the main support surface, the mount including a pair of spaced apart guide rails on which the air table is movably mounted, the guide rails being affixed to the main support surface on opposite sides of the circular saw cutting blade and extending from the main support surface in a direction generally transverse to the first plane of the circular saw cutting blade such that the air table is movable along the guide rails in the transverse direction;
- an air source having a first opening for producing a vacuum and a second opening for producing a stream of pressurized air;
- a conduit having one end connected to one of the openings of the air source; and
- a valve structure having a first portion connected to the other end of the conduit and a second portion connected to at least one of the ports of the air table for selectively communicating the air flow, respectively, to at least one of the subsections of the body portion to produce a force over a selected portion of the table top for effecting movement of the workpiece over the table top,
- wherein when the first opening of the air source is connected to the conduit, the air flow acts to inhibit movement of the workpiece over the table top, and wherein when the second opening of the air source is connected to the conduit, the air flow acts to facilitate movement of the workpiece on the table top.

7. The table saw of claim 6 wherein the second portion of the valve structure comprises a manifold mounted over the plurality of ports in the body portion, the manifold being movable to selectively cover at least one of the ports for selectively communicating the air flow produced by the air source to at least one of the ports and the associated subsections of the body portion.

8. A table saw comprising:
- a main saw unit including a generally planar support surface and a circular saw blade projecting at least partially through the support surface, the circular saw blade being positionable in a first plane substantially perpendicular to the planar support surface;
- a pair of parallel spaced apart guide rails extending from the main saw unit in a direction generally transverse to the first plane of the saw blade;
- an air table mounted on and extending between the pair of guide rails and movable in a generally transverse direction relative to the first plane of the circular saw blade, the air table including:
  - a body portion having a plurality of subsections and a plurality of ports formed therein, each port being in communication with a respective one of the subsections, and
  - a generally planar table top substantially coplanar with the main support surface, the table top having a plurality of holes therethrough and being attached to the body portion to cover the subsections;
- an air source for producing a stream of pressurized air, and
- a manifold connected to the air source and to at least one of the ports for selectively communicating the pressurized air produced by the air source to at least one of the subsections of the body portion to produce a cushion of air over a selected portion of the table top for facilitating movement of the workpiece over the table top.

9. The table saw of claim 7 wherein the manifold is pivotally attached to an underside of the body portion.

10. The table saw of claim 8 wherein the manifold is pivotally attached to an underside of the body portion.

* * * * *